United States Patent [19]

Hohenegger et al.

[11]  4,227,880
[45]  Oct. 14, 1980

[54] PROCESS FOR THE PRODUCTION OF DUSTFREE GRANULES OF DYES AND OPTICAL BRIGHTENERS

[75] Inventors: Helmut Hohenegger, Riehen; Hanspeter Baumann, Lausen; Urs Büchel, Oberwil, all of Switzerland

[73] Assignee: Ciba-Geigy Corporation, Ardsley, N.Y.

[21] Appl. No.: 896,417

[22] Filed: Apr. 14, 1978

[30] Foreign Application Priority Data

Apr. 18, 1977 [CH] Switzerland ............................ 4758/77
Mar. 17, 1978 [CH] Switzerland ............................ 2936/78

[51] Int. Cl.$^2$ .......................... D06P 1/64; C09B 67/00; C09K 11/02
[52] U.S. Cl. ............................................ 8/524; 8/582; 8/594; 252/301.21; 252/301.32
[58] Field of Search ................................ 8/79, 173, 92; 252/301.21, 301.32

[56] References Cited

U.S. PATENT DOCUMENTS

| | | | |
|---|---|---|---|
| 2,181,800 | 11/1939 | Crossley | 8/79 |
| 2,477,165 | 7/1949 | Bergstrom | 8/79 |
| 3,069,218 | 12/1962 | Hermes | 8/92 |
| 3,069,221 | 12/1962 | Hermes | 8/92 |
| 3,070,418 | 12/1962 | Bann et al. | 8/79 |
| 3,529,927 | 9/1970 | Ulrich | 8/171 |
| 3,630,664 | 12/1971 | Nentwig et al. | 8/92 |
| 3,791,787 | 2/1974 | Yamada et al. | 8/54.2 |
| 4,058,480 | 11/1977 | Lohmann | 8/79 |

FOREIGN PATENT DOCUMENTS

| | | | |
|---|---|---|---|
| 51-75188 | 6/1976 | Japan | 8/173 |
| 1349511 | 4/1974 | United Kingdom . | |

Primary Examiner—Joseph L. Schofer
Assistant Examiner—Maria S. Tungol
Attorney, Agent, or Firm—Prabodh I. Almaula

[57] ABSTRACT

Described is a process for the production of solid dust-free preparations of water-soluble dyes and optical brighteners, which process comprises subjecting the pulverulent dyes or optical brighteners, together with a melt or a solution of ethylene carbonate or propylene carbonate, to a dynamic treatment. The preparations obtained have in particular the advantage that the dust-binding effect is retained undiminished over a long period of time, and that they are completely soluble when used in aqueous baths of dyes or optical brighteners.

10 Claims, No Drawings

PROCESS FOR THE PRODUCTION OF DUSTFREE GRANULES OF DYES AND OPTICAL BRIGHTENERS

The present invention relates to a process for the production of dustfree granules of dyes and optical brighteners, and also to the dustfree granules of dyes and optical brighteners produced by this process.

Pulverulent dyes and optical brighteners, which are reduced to a standard quality by a grinding and mixing process or by means of spray drying, have to be rendered dustfree in order to satisfy the present-day requirements which commercial preparations have to meet. One method of rendering material dustfree which is commonly used is that based on an adhesion of liquid and solids. In this case, a liquid dust-binding agent is sprayed, e.g., onto the surface of the powder, with the result that bridges of liquid are formed between the particles and effect a sticking together of the particles.

A known dust-binding agent is "Essotex" (mineral oil), which however has the disadvantage that it is not soluble in water but only emulsifiable. But also among the water-soluble dust-binding agents, such as glycerol and the block polymers formed from ethylene oxide and propylene oxide, there are only a few which do not have, or do not develop, disadvantageous properties. The dust-binding action is frequently of short duration because the dust-binding agent diffuses from the surface into the particle, or there occurs a lumping together of the powder by virtue of the adhesion being too great. Since the dust-binding action with liquid dust-binding agents is attributable to an intensifying of the adhesion between the particles, an impairment of the pourability of the material cannot be avoided. Both properties—effective long-lasting binding of the dust and good pourability—cannot therefore be imparted to the product in this way. Furthermore, there is obtained with liquid dust-binding agents merely a limited binding of the dust, and this degree of binding cannot be exceeded even by the addition of larger amounts of dust-binding agents.

It is known that by a mixing and/or tumbling movement of powders in the presence of, or with the introduction of, a liquid phase, it is possible to form granules [see, e.g., H. B. Ries: "Aufbaugranulierung" (Build-up granulation) in "Aufbereitungstechnik" (Preparation techniques) - No. 11/1971, pages 675 ff].

It has now been found that granules can be obtained which do not have the above-mentioned disadvantages if ethylene carbonate or propylene carbonate is used as the dust-binding and granulating agent.

The use of ethylene carbonate or propylene carbonate as a dust-binding and granulating agent is new and enables dustfree, readily pourable granules to be obtained. These have in particular the advantage that the dust-binding effect is retained undiminished over a long period of time, and that they are completely soluble when used in aqueous baths of dyes or optical brighteners.

The present invention hence relates to a process for producing dustfree granules of water-soluble dyes and optical brighteners, which process comprises subjecting the pulverulent dyes or optical brighteners, together with a melt or a solution of ethylene carbonate or propylene carbonate, to a dynamic treatment. An aqueous solution is preferably used as solution.

The dyes which are used in the process according to the invention must be soluble in water. They are anionic dyes or preferably cationic dyes. Suitable water-soluble anionic dyes are in particular metal-free and metallised, sulphonated monoor disazo dyes, and also sulphonated anthraquinone, nitro and phthalocyanine dyes.

Suitable water-soluble cationic dyes are, e.g., salts, for example chlorides, sulphates, onium chlorides, fluoroborates or metal halide salts, for example zinc chloride salts, of azo dyes, such as monoazo, disazo and polyazo dyes, anthraquinone dyes, phthalocyanine dyes, diphenylmethane dyes and triarylmethane dyes, methine, polymethine and azomethine dyes, and of thiazole, ketonimine, acrydine, cyanine, nitro, quinoline, benzimidazole, xanthene, azine, oxazine and thiazine dyes.

The water-soluble optical brighteners can belong to the widest variety of classes. Particularly suitable are anionic compounds derived from the stilbene class, and cationic compounds derived from the coumarin class.

The water-soluble dyes and optical brighteners can also cary fibre-reactive groups.

The dustfree granules are produced by subjecting the dry water-soluble dyes or optical brighteners at room temperature to a dynamic treatment, and simultaneously adding a melt or solution of ethylene carbonate or propylene carbonate, preferably by fine spraying or coarse spraying.

The dynamic treatment is effected by means of a force by which the substances to be granulated are set into relative reciprocal motion, e.g. by grinding, stirring, mixing or tumbling, for example in a rotating drum.

The dyes or optical brighteners should be in a dry pulverulent form, i.e. having a water content of less than 10%, and they can contain additives such as salts or diluting agents, e.g. Glauber's salt, sodium chloride, sodium carbonate, carbohydrates, such as dextrin, starch and/or dyeing auxiliaries or surface-active agents, e.g. wetting agents, levelling agents or retarders. These additives can also be present in the melt or aqueous solution of ethylene carbonate or propylene carbonate.

The temperature of the melt of ethylene carbonate is preferably about 40° to 70° C., and that of propylene carbonate preferably 20° to 50° C., and the solution of ethylene carbonate is added preferably at a temperature of 20° to 50° C. to the dyes or optical brighteners.

The aqueous solution contains preferably 30 to 90 percent by weight, especially 40 to 60 percent by weight, of ethylene carbonate or propylene carbonate, relative to the total weight of the solution.

The addition of the melt or solution of ethylene carbonate or propylene carbonate is made perferably during 30 seconds to 10 minutes. The mixture of ethylene carbonate or propylene carbonate and dyes or optical brighteners is subsequently subjected, e.g. during 2 to 10 minutes, to a mixing or tumbling movement, and then optionally dried.

There are obtained by the process according to the invention dustfree granules of dyes or optical brighteners; these granules have a particle size of approximately 40μ to 2 mm and are distinguished by their complete water solubility, by their good pourability and by their dust being permanently bound. By "dustfree" is meant that the granules in the test subsequently described have the rating 4 to 5 or 5.

The following dust test was performed in order to determine the behaviour of the granules with respect to dust release.

Onto a metal cylinder of 500 ccm capacity with an inside diameter of 50 mm is placed a metal funnel having an inside diameter of 10 cm and a tube (inside diameter 15 mm) of which the lower end extends down to the 200 ccm level of the cylinder. At the 400 ccm level on the cylinder is secured a round paper filter (Schleicher & Schuell LS14) which has a hole in the centre and which is moistened with water to the extent that it is moderately moist but not dripping wet. An amount of 10 g of the substance to be tested is then rapidly fed through the funnel; a waiting time of 3 minutes is subsequently allowed, the funnel is taken out, and the round paper filter is removed by cutting. This filter paper is then assessed on the basis of an evaluation scale of 5 ratings as follows:

rating 1 = severe release of dust if round paper filter is heavily tinted to intensely stained;
rating 2 = considerable dust release if the round paper filter is slightly tinted;
rating 3 = moderate dust release if the round paper filter displays a large number of spots of colour which are in partial contact with each other;
rating 4 = slight release of dust if the round paper filter displays specks of dye but no connected spots of colour; and
rating 5 = negligible dust release if the round paper filter displays a scarcely perceptible staining or at most scattered specks of dye.

The granules consist of 30 to 95, particularly 40 to 85, percent by weight of dye or of optical brightener; 1 to 25, especially 2 to 15, percent by weight of ethylene carbonate or propylene carbonate; and 1 to 70, particularly 10 to 50, percent by weight of additives. The granules are especially suitable for producing aqueous dye liquors or optical brightener liquors and printing pastes, which can be used for dyeing or printing or optically brightening the widest range of materials suitable for said classes of dyes.

The following Examples serve to further illustrate the invention without the scope of the invention being limited to them. In these Examples, % denotes percent by weight, and the stated amounts in the case of the dyes relate to the dyes as they are obtained on synthesis.

EXAMPLE 1

7.7 g of ethylene carbonate is melted in a 200 ml beaker on a heatable magnetic stirrer. 74.9 g of the red dye of the formula

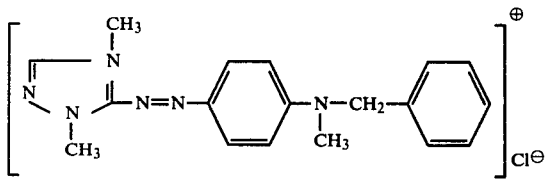

and 15.4 g of sodium sulphate (anhydrous) are ground in a laboratory mixer having rapidly rotating blades for about 2 minutes. While rapid stirring is maintained, the melted ethylene carbonate at 60° C. is added dropwise by means of a pipette within five minutes, and stirring is subsequently continued for two minutes. There are formed in this way dustfree, readily pourable granules 0.2 to 2.0 mm in size, which in the dust test described in the foregoing are given the rating 4 to 5, whereas the employed dye before granulation is given the rating 1 to 2.

After 6 months of storage at room temperature, the granules exhibit no change in their behaviour with respect to dust release.

The granules obtained consist of 7.9% of ethylene carbonate, 76.4% of dye and 15.7% of sodium sulphate.

EXAMPLE 2

3.4 g of ethylene carbonate is melted in a 100 ml beaker on a heatable magnetic stirrer. 41.9 g of a dye mixture consisting of the blue dye of the formula

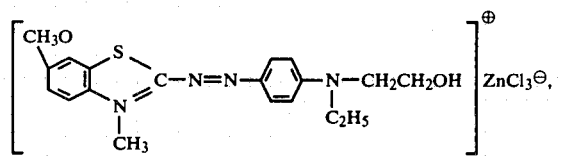

the red dye from Example 1,
the green dye of the formula

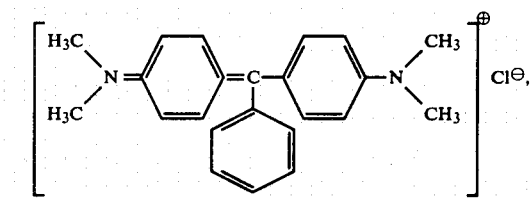

and the orange dye of the formula

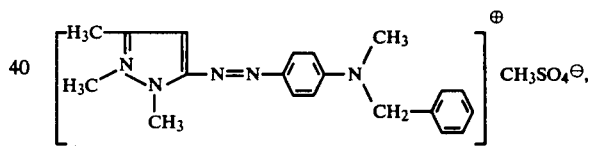

as well as 54.7 g of sodium sulphate, are ground in a laboratory mixer having rapidly rotating blades for about 2 minutes. While rapid stirring is maintained, the ethylene carbonate at 60° C. is added dropwise with a pipette in the course of one minute. There are thus obtained dustfree, readily pourable granules 0.2 to 2.0 mm in size, which in the dust test described in the foregoing are given the rating 4 to 5, whereas the employed dye before granulation receives the rating 1 to 2 in this test.

After 6 months in storage at room temperature, the granules exhibit no change in their behaviour with respect to dust release.

The granules obtained consist of 3.4% of ethylene carbonate, 41.9% of dyes and 54.7% of sodium sulphate.

EXAMPLE 3

6.8 g of ethylene carbonate and 2.3 g of an adduct from stearyldiphenyloxethyl-diethylenetriamine and ethylene oxide (levelling agent) are melted on a heatable magnetic stirrer.

90.9 g of the yellow dye of the formula

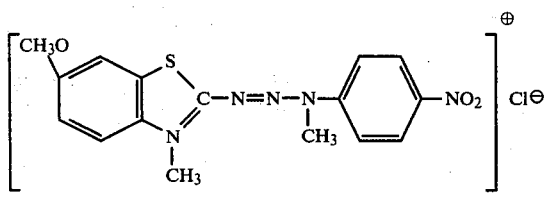
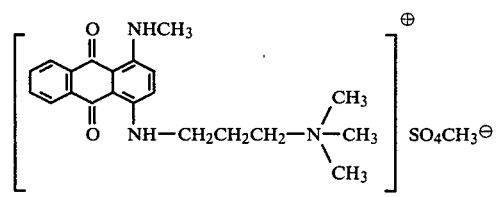

is ground in a laboratory mixer with rapidly rotating blades for about 2 minutes. While rapid stirring is maintained, the melt at 60° C. is added dropwise by means of a pipette within two minutes, and stirring is continued for five minutes. There are thus obtained dustfree, readily pourable granules 0.2 to 2.0 mm in size, which in the dust test described in the foregoing are given the rating 4 to 5, whereas the employed dye before granulation is given the rating 1 to 2.

After 6 months in storage at room temperature, the granules exhibit no change in their behaviour with respect to dust release.

The granules obtained consist of 6.8% of ethylene carbonate, 2.3% of levelling agent and 90.9% of dye.

EXAMPLE 4

5.5 g of ethylene carbonate and 1.9 g of the levelling agent used in Example 3 are melted on a heatable magnetic stirrer.

69.0 g of the yellow dye of the formula

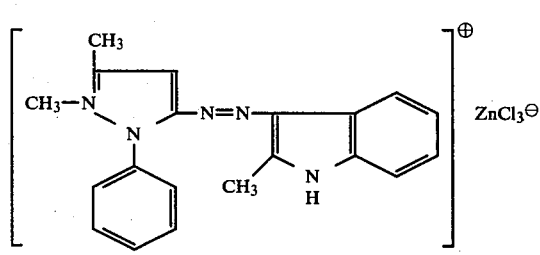

and 23.6 g of dextrin made from potato starch are ground in a laboratory mixer having rapidly rotating blades for about 2 minutes. With slow stirring, the melt at 60° C. is added dropwise by means of a pipette within 2 minutes. There are thus obtained dustfree, readily pourable granules 0.2 to 2.0 mm in size, which are given the rating 4 to 5 in the dust test described in the foregoing, whereas the employed dye before granulation is given the rating 1 to 2 in this test.

After 6 months' storage at room temperature, the granules show no change in their behaviour with respect to dust release.

The granules obtained consist of 5.5% of ethylene carbonate, 69% of dye and 25.5% of additives (levelling agent and dextrin).

EXAMPLE 5

10.4 g of ethylene carbonate is melted on a heatable magnetic stirrer.

77.9 g of the blue dye of the formula and 11.7 g of dextrin made from potato starch are ground in a laboratory mixer having rapidly rotating blades for about 2 minutes. With rapid stirring, the ethylene carbonate at 60° C. is added dropwise by means of a pipette within one minute, and stirring is continued for 3 minutes. There are thus obtained dustfree, readily pourable granules 0.2 to 2.0 mm in size, which in the dust test described in the foregoing are given the rating 4 to 5, whereas the employed dye before granulation receives the rating 1 to 2 in this test.

After 6 months in storage at room temperature, the granules exhibit no change in their behaviour with respect to dust release.

The granules obtained consist of 10.4% of ethylene carbonate, 77.9% of dye and 11.7% of additive (dextrin).

EXAMPLE 6

3.5 g of water and 3.6 g of ethylene carbonate are placed into a 100 ml beaker, and heated on a heatable magnetic stirrer to 40° C.

49.5 g of the blue dye of the formula

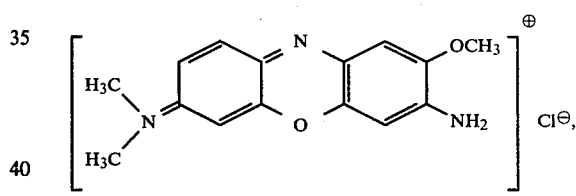

18.6 g of sodium sulphate and 18.6 g of dextrin made from potato starch are ground in a laboratory mixer having rapidly rotating blades for about 2 minutes, and 6.2 g of polyoxypropylene glycol (Pluronic L 35 ®) is added. The ethylene carbonate solution is subsequently added within one minute by means of a pipette, and stirring is continued for a further 2 minutes. The moist granules are dried in a drying chamber at 50° C. for 2 hours.

There are thus obtained dustfree, readily pourable granules 0.2 to 2.0 mm in size, which are given in the dust test described in the foregoing the rating 4 to 5, whereas the employed dye before granulation is given the rating 1 to 2 in this test.

After 6 months in storage at room temperature, the granules exhibit no change in their behaviour with respect to dust release.

The granules obtained consist of 3.7% of ethylene carbonate, 51.3% of dye and 45.0% of additives (sodium sulphate, dextrin and polyoxypropylene glycol.

EXAMPLE 7

5.5 g of water and 5.5 g of ethylene carbonate are placed into a 100 ml beaker, and heated on a heatable magnetic stirrer to 40° C.

68.5 g of the dye of the formula

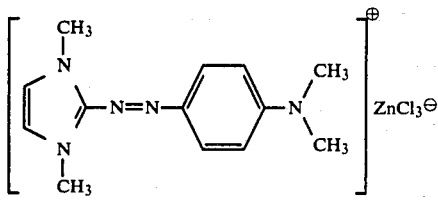

and 20.5 g of dextrin from potato starch are ground in a laboratory mixer having rapidly rotating blades for about 2 minutes. With rapid stirring, the ethylene carbonate solution (30° C.) is added dropwise by means of a pipette within 5 minutes, and stirring is continued for a further two minutes. The moist granules are dried for 2 hours in a drying chamber at 50° C.

There are thus obtained dustfree, readily pourable granules 0.2 to 2.0 mm in size, which in the dust test described in the foregoing are given the rating 4 to 5, whereas the employed dye before granulation is given the rating 1 to 2 in this test.

The granules exhibit after storage for 6 months at room temperature no change in their behaviour with respect to dust release.

The resulting granules consist of 5.8% of ethylene carbonate, 72.5% of dye and 21.7% of additive (dextrin).

EXAMPLE 8

6.4 g of water and 6.4 g of ethylene carbonate are placed into a 100 ml beaker, and heated on a heatable magnetic stirrer to 40° C.

80.0 g of the orange dye of the formula

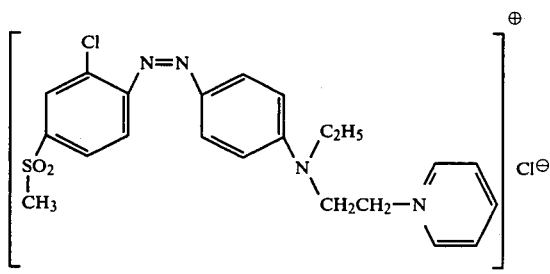

and 7.2 g of dextrin from potato starch are ground in a laboratory mixer having rapidly rotating blades for about 2 minutes. With slow stirring, the ethylene carbonate solution is added dropwise by means of a pipette within 3 minutes. The moist granules are dried in a drying chanber at 50° C. for 2 hours.

There are thus obtained dustfree, readily pourable granules 0.2 to 2.0 mm in size, which are given in the dust test described in the foregoing the rating 4 to 5, whereas the employed dye before granulation is given the rating 1 to 2 in this test.

The granules obtained consist of 6.8% of ethylene carbonate, 85.5% of dye and 7.7% of additive (dextrin).

EXAMPLE 9

5.4 g of water and 5.4 g of ethylene carbonate are placed into a 100 ml beaker, and heated on a heatable magnetic stirrer to 40° C.

40.0 g of the dye from Example 8 and 49.2 g of dextrin from potato starch are ground in a laboratory mixer having rapidly rotating blades for about 2 minutes. With slow stirring, the ethylene carbonate solution is added dropwise by means of a pipette within 5 minutes, and stirring is continued for a further 2 minutes. The moist granules are dried in a drying chamber at 50° C. in the course of 2 hours.

There are thus obtained dustfree, readily pourable granules 0.2 to 2.0 mm in size, which are given in the dust test described in the foregoing the rating 4 to 5, whereas the employed dye before granulation is given the rating 1 to 2.

The granules exhibit after storage for 6 months at room temperature no change in their behaviour with respect to dust release.

The granules obtained consist of 5.7% of ethylene carbonate, 42.3% of dye and 52.0% of additive (dextrin).

EXAMPLE 10

2.0 g of water and 2.0 g of ethylene carbonate are placed into a 100 ml beaker, and heated on a heatable magnetic stirrer to 40° C.

52.9 g of the yellow dye of the formula

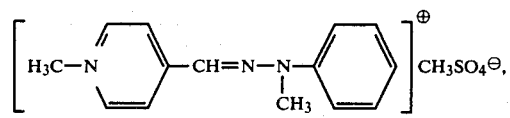

21.5 g of sodium sulphate (anhydrous) and 21.6 g of dextrin from potato starch are ground in a laboratory mixer having rapidly rotating blades for about 2 minutes. With slow stirring, the ethylene carbonate solution is added dropwise by means of a pipette within 5 minutes, and stirring is maintained for a further 4 minutes. The moist granules are dried at 50° C. in a drying chamber.

There are thus obtained dustfree, readily pourable granules 0.2 to 2.0 mm in size, which are given the rating 4 to 5 in the dust test described in the foregoing, whereas the employed dye before granulation is given the rating 1 to 2.

The granules exhibit after storage for 6 months at room temperature no change in their behaviour with respect to dust release.

The granules obtained consist of 2.2% of ethylene carbonate, 53.9% of dye, 21.9% of sodium sulphate and 22.0% of additive (dextrin).

EXAMPLE 11

2.2 g of water and 2.2 g of ethylene carbonate are placed into a 100 ml beaker, and heated on a heatable magnetic stirrer to 40° C.

44.4 g of a dye mixture consisting of the blue dye from Example 2, the red dye of the formula

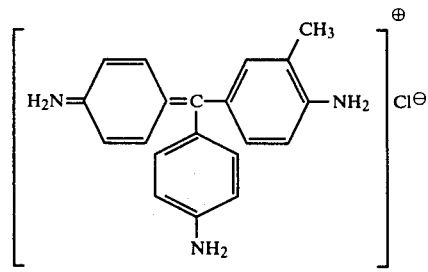

and the green dye from Example 2 and 51.2 g of sodium sulphate (anhydrous) are ground in a laboratory mixer having rapidly rotating blades for about 2 minutes. With rapid stirring, the ethylene carbonate solution is added dropwise by means of a pipette within 3 minutes, and stirring is maintained for a further 2 minutes. The moist granules are dried at 50° C. in a drying chamber for 2 hours. There are thus obtained dustfree, readily pourable granules 0.2 to 2.0 mm in size, which are given the rating 4 to 5 in the dust test described in the foregoing, whereas the employed dye before granulation receives the rating 1 to 2 in this test.

After 6 months' storage at room temperature, the granules exhibit no change in their behaviour with respect to dust release.

The resulting granules consist of 2.3% of ethylene carbonate, 45.4% of dye and 52.3% of additive (sodium sulphate).

EXAMPLE 12

25.0 g of water and 25.0 g of ethylene carbonate are placed in a 100 ml beaker and heated on a magnetic stirrer to 40° C.

133.4 g of the blue dye of the formula

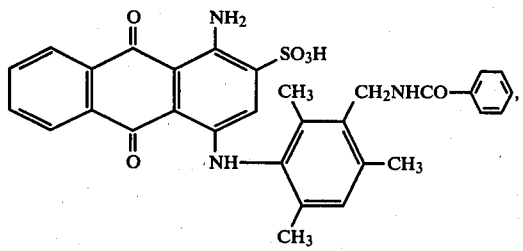

26.6 g of sodium sulphate and 6.6 g of sulphite liquor are homogenised in a 1000 ml powder bottle, and the mixture is transferred to a mixing drum of 5 liters capacity. The cylindrical drum containing the homogeneous dye/diluting agent mixture rotates at a speed of about 0.25 m/sec.; the dye is maintained in motion and is simultaneously sprayed with the ethylene carbonate solution by means of a two-component nozzle (air and liquid) for one minute. Granules are formed and these are dried at 50° C. in a drying chanber.

There are thus obtained dustfree, readily pourable granules 0.1 to 2.0 mm in size, which are given the rating 4 to 5 in the dust test described in the foregoing, whereas the employed dye before granulation receives the rating 1 to 2 in this test.

After 6 months' storage at room temperature, the granules exhibit no change in their behaviour with respect to dust release.

EXAMPLE 13

27.0 g of propylene carbonate is mixed with 1 g of an emulsifier (alkylphenolpolyglycol ether), emulsified in 26.0 g of water, and heated on a magnetic stirrer to 30° C.

210 g of the red dye of the formula

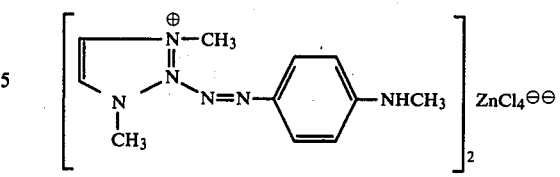

and 90.0 g of anhydrous sodium sulphate (diluting agent) are homogenised for about 1 minute in a laboratory mixer having rapidly rotating blades, and the mixture is then transferred to a mixing drum of 5 liters capacity. The cylindrical drum containing the homogeneous dye/diluting agent mixture rotates at a speed of about 0.25 m/sec.; the dye is kept in motion and is simultaneously sprayed with the aqueous propylene carbonate emulsion by means of a two-component nozzle (air and liquid) for 9 minutes. Granules are formed and these are subsequently dried in a fluidised bed dryer with an air temperature of 80° C. for 10 minutes.

There are thus obtained dustfree, readily pourable granules 0.1 to 2.0 mm in size, which are given the rating 5 in the dust test described in the foregoing, whereas the employed dye before granulation receives the rating 1 in this test.

After storage for 3 months at room temperature, the granules exhibit no change in their behaviour with respect to dust release.

The granules obtained consist of 8.3% of propylene carbonate, 64.0% of dye, 27.4% of sodium sulphate and 0.3% of nonylphenolpolyglycol ether.

EXAMPLE 14

6.3 g of propylene carbonate and 4.2 g of dextrin are dissolved in 10.5 g of water in a beaker with stirring at 40° C.

87.0 g of the red dye of the formula given in Example 1 and 13.0 g of dextrin (diluting agent) are ground in a laboratory mixer having rapidly rotating blades for about 2 minutes, and the mixture is then placed into a mixing drum of 5 liters capacity. The cylindrical drum containing the homogeneous dye/diluting agent mixture rotates at a speed of about 0.25 m/sec.; the dye is maintained in motion and is simultaneously sprayed with the propylene carbonate/dextrin solution by means of a two-component nozzle (air and liquid) for 2½ minutes. Granules are formed and these are dried in a fluidised bed dryer with warm air at 80° C. for 5 minutes.

There are thus obtained negligibly dusty, readily pourable granules 0.1 to 2.0 mm in size, which are given the rating 4 in the dust test described in the foregoing, whereas the employed dye before granulation receives the rating 1 in this test.

The granules obtained consist of 5.7% of propylene carbonate, 78.7% of dye and 15.6% of dextrin.

EXAMPLE 15

92 kg of ethylene carbonate is completely dissolved with stirring in 92 kg of hot water.

1000 kg of the dye of the formula given in Example 1 is continuously fed, with a dosing rate of 200 kg per hour, into a continuous granulating plant, whilst simultaneously 32 liters per hour of the ethylene carbonate solution is continuously applied as a fine spray. The moist granules emerging from the granulating plant are dried at 90° C. in a fluidised bed dryer.

There are thus obtained dustfree, readily pourable granules 0.2 to 2.0 mm in size, which are given the rating 4 to 5 in the dust test described in the foregoing, whereas the employed dye before granulation receives the rating 1 to 2 in this test.

The granules after storage at room temperature for 6 months exhibit no change in their behaviour with respect to dust release.

The granules obtained consist of 8.4% of ethylene carbonate and 91.6% of dye.

EXAMPLE 16

10 g of ethylene carbonate is melted in a 200 ml beaker on a heatable magnetic stirrer.

75 g of the optical brightener of the formula

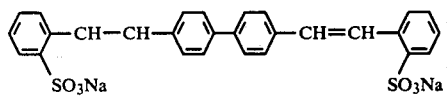

and 15 g of sodium chloride are ground in a laboratory mixer having rapidly rotating blades for about 2 minutes. With rapid stirring, the melted ethylene carbonate at 60° C. is added dropwise by means of a pipette within 5 minutes, and stirring is continued for two minutes.

There are thus obtained dustfree, readily pourable granules 0.2 to 2.0 mm in size, which are given the rating 4 to 5 in the dust test described in the foregoing.

The granules after 6 months in storage at room temperature exhibit no change in their behaviour with respect to dust release.

The granules obtained consist of 10% of ethylene carbonate, 75% of optical brightener and 15% of sodium chloride.

EXAMPLE 17

1.8 g of ethylene carbonate, 1.2 g of dextrin and 3 g of water are dissolved in a 200 ml beaker on a heatable magnetic stirrer.

37.4 g of the optical brightener of the formula

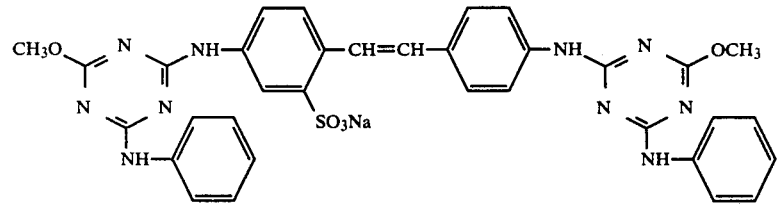

and 56.6 parts of urea are ground in a laboratory mixer having rapidly rotating blades for about 2 minutes. With rapid stirring, the ethylene carbonate solution at 60° C. is added dropwise by means of a pipette within 5 minutes, and stirring is maintained for a further two minutes. The moist granules are subsequently dried at 50° C. in a drying chamber.

There are thus obtained dustfree, readily pourable granules 0.2 to 2.0 mm in size, which are given the rating 4 to 5 in the dust test described in the foregoing.

The granules obtained exhibit after 6 months in storage at room temperature no change in their behaviour with respect to dust release.

EXAMPLE 18

3.1 g of ethylene carbonate and 2.1 g of dextrin are melted in a 200 ml beaker on a heatable magnetic stirrer.

25.8 g of the optical brightener of the formula

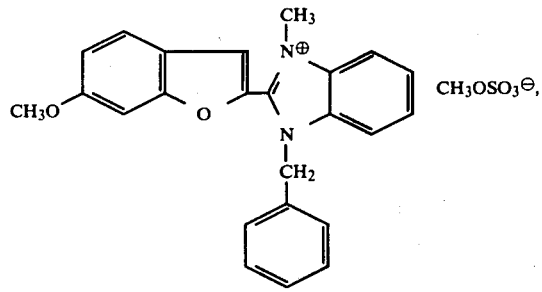

34.5 g of sodium sulphate (anhydrous) and 34.5 g of dextrin from potato starch are ground in a laboratory mixer having rapidly rotating blades for about 2 mintes. With rapid stirring, the melted ethylene carbonate is added dropwise by means of a pipette within five minutes, and stirring is maintained for a further 2 minutes.

There are thus obtained dustfree, readily pourable granules 0.2 to 2.0 mm in size, which are given the rating 4 to 5 in the dust test described in the foregoing.

The granules after 6 months in storage at room temperature exhibit no change in their behaviour with respect to dust release.

The granules obtained consist of 3.1% of ethylene carbonate, 25.8% of optical brightener, 34.5% of sodium sulphate and 36.6% of dextrin.

We claim:

1. Process for the production of solid dustfree preparations of water-soluble dyes and optical brighteners, which comprises subjecting the pulverulent dyes or optical brighteners, together with a melt or a solution of ethylene carbonate or propylene carbonate, to a dynamic treatment.

2. Process according to claim 1, wherein a solution or melt of ethylene carbonate is used.

3. Process according to claim 1, wherein the melt or solution of ethylene carbonate or propylene carbonate contains further additives selected from the group comprising diluting agents, dyeing auxiliaries or mixtures thereof.

4. Process according to claim 1 or 2, wherein the dyes or optical brighteners contain further additives selected from the group comprising diluting agents, dyeing auxiliaries or mixtures thereof.

5. Process according to claim 1 or 3, wherein the melt or solution of ethylene carbonate or propylene carbonate is finely or coarsely sprayed onto the dyes or optical brighteners.

6. Process according to claim 1, wherein there is applied a solution of ethylene carbonate or propylene carbonate at 20° to 50° C., or a melt of ethylene carbonate at 40° to 70° C. or of propylene carbonate at 20° to 50° C.

7. Process according to claim 1 or 3, wherein the solution contains 30 to 70, percent by weight of ethylene carbonate or propylene carbonate.

8. A process according to claim 7, wherein the solution contains 40 to 60 percent by weight of ethylene carbonate or propylene carbonate.

9. Granules of water-soluble dyes or optical brighteners, which granules contain 30 to 95 percent by weight of dye or of optical brightener, 1 to 25 percent by weight of ethylene carbonate or propylene carbonate, and 1 to 70 percent by weight of additives selected from the group comprising diluting agents, dyeing auxiliaries or mixtures thereof.

10. Granules according to claim 9, which granules contain 40 to 85 percent by weight of dye or of optical brightener, 2 to 15 percent by weight of ethylene carbonate or propylene carbonate, and 10 to 50 percent by weight of said additives.

* * * * *